United States Patent [19]

Eichhorst

[11] 4,114,957

[45] Sep. 19, 1978

[54] METHOD AND APPARATUS FOR CONTROLLING THE WHEEL BRAKES TO PREVENT SKID

[76] Inventor: Gustav E. Eichhorst, 7361 Valentown Rd., Victor, N.Y. 14564

[21] Appl. No.: 695,101

[22] Filed: Jun. 11, 1976

Related U.S. Application Data

[63] Continuation of Ser. No. 508,553, Sep. 23, 1974, abandoned, which is a continuation of Ser. No. 352,267, Apr. 18, 1973, abandoned.

[51] Int. Cl.$^2$ .............................................. B60T 8/10
[52] U.S. Cl. .................................. 303/96; 188/181 C; 324/161; 361/242
[58] Field of Search ........................... 73/146.2, 146.5; 180/82 R, 82 D, 105 E; 188/181 C; 235/150.2; 303/20, 91, 96, 99, 100, 106, 109; 307/233 B; 317/5, 6; 324/161; 340/52 B, 53, 62, 263, 58; 361/238, 242; 364/426

[56] References Cited

U.S. PATENT DOCUMENTS

| | | | |
|---|---|---|---|
| 3,537,002 | 10/1970 | Haner et al. | 324/161 X |
| 3,608,978 | 9/1971 | Neisch | 303/96 |
| 3,613,075 | 10/1971 | Griffiths et al. | 73/146.2 X |
| 3,620,577 | 11/1971 | Neisch et al. | 303/96 |
| 3,629,815 | 12/1971 | Hattwig | 340/52 B |
| 3,656,815 | 4/1972 | Talebi et al. | 303/99 |
| 3,657,601 | 4/1972 | Darrow | 303/97 X |
| 3,719,246 | 3/1973 | Bott | 303/100 X |
| 3,735,200 | 5/1973 | Kritz | 303/109 X |
| 3,948,570 | 4/1976 | Fukumori et al. | 303/20 X |

Primary Examiner—Stephen G. Kunin

[57] ABSTRACT

A brake control system for vehicles in which the difference in speed of rotation of a corresponding pair of wheels is detected in a prebraking mode of operation. If the difference in rotational speed exceeds a predetermined amount, the brakes on the pair of wheels are disabled. In one embodiment of the invention, the prebraking rotational speed ratio of the pair of wheels is determined by a comparator and electronic voltage control circuit, and the electrical output thereof fed to a valve control circuit for controlling the brake valves to maintain the braking rotational speed ratio of the wheels substantially equal to the prebraking rotational speed ratio. In the event the control circuits are unable to maintain the braking rotational speed ratio substantially equal to the prebraking rotational speed ratio, and such ratio exceeds a predetermined value, and a pendulum switch mechanism combined therewith indicates the beginning of a vehicle skid and spin, the brakes will be automatically disabled on both wheels. The disablement of the brakes is caused by a pair of pendulum switch mechanisms in combination with the control circuit.

13 Claims, 12 Drawing Figures

METHOD AND APPARATUS FOR CONTROLLING THE WHEEL BRAKES TO PREVENT SKID

CROSS REFERENCE TO RELATED APPLICATIONS

This is a continuation of patent application Ser. No. 508,553 filed on Sept. 23, 1974, now abandoned which is a continuation of Ser. No. 352,267 filed on Apr. 18, 1973, now abandoned.

BACKGROUND OF THE INVENTION

1. Field of the Invention

This invention relates generally to brake control systems, and more specifically to an improved vehicle brake control system.

2. Description of the Prior Art

U.S. Pat. No. 3,691,524 relates to a tire inflation monitoring system for monitoring the angular movement of the wheels of a vehicle. By counting the revolutions on each of the wheels and comparing the count with the count from another wheel, it is possible to determine whether or not each wheel has the same diameter. An indicating means is provided for signalling an occupant of the vehicle when a tire thereon is underinflated. A disadvantage of this prior art monitoring system is its lack of sensitivity which precludes its use for operating a meter or indicating differences in wheel revolutions during braking.

U.S. Pat. No. 2,522,139 relates to a frequency responsive system for comparing two alternating current frequencies and creating a third frequency in relation to the difference in the two frequencies to indicate the sense and magnitude of this difference. A disadvantage of this frequency responsive system is that the compared frequencies involved are high and the difference frequency low in relation thereto so that this system is not readily usable in a monitoring system of the type disclosed in U.S. Pat. No. 3,691,524.

U.S. Pat. No. 3,797,893 relates to a brake force control system for vehicles in which a sensor is coordinated with each wheel for detecting its rotational condition. The signals from the sensors actuate inlet and outlet valves when they exceed or drop below certain threshold values so that the brake pressure either increases, remains constant, or decreases. In vehicles with a high center of gravity and especially with a short wheel base, an additional logic circuit connection is provided which decreases the pressure at the front wheel brakes if a signal symbolizing the road traction of the rear wheels does not arrive within a certain time delay.

U.S. Pat. Nos. 3,260,555, 3,482,887 and 3,756,663 are exemplary of anti-skid brake systems having electrical means for sensing the rotational speed of individual wheels. An electrical signal is obtained as a result of a variation in the signal in relation to a predetermined characteristic. The signal is used to automatically operate means for controlling and releasing the braking force on any wheel or number of wheels revolving slower than a desired speed. Although the latter patents all operate satisfactorily for preventing the wheels of a vehicle to skid, none of them are capable, among other things, of determining the prebraking rotational speed ratio of a pair of wheels and by controlling the brake force applied to the wheels maintaining the braking rotational speed ratio substantially equal to the prebraking rotational speed ratio.

SUMMARY OF THE INVENTION

In accordance with the preferred embodiments of the invention, an improved method is disclosed for controlling the brakes of a vehicle. The apparatus for practicing the method broadly comprises means for detecting the speed of rotation of a pair of wheels in a prebraking mode of operation, and if the difference in speed exceeds a predetermined amount, actuating means for disabling the brakes of the pair of wheels. More specifically, the detecting means generates first and second pulses of energy for the pair of wheels respectively. A novel comparer and voltage control circuit is provided comprising first and second pulse frequency counters connected in opposed relation for receiving the first and second pulses respectively and generating a signal when both pulses energize a station of the circuit which is indicative of the prebraking rotational speed ratio of the first and second wheels. First and second brakes are provided on the first and second wheels respectively, and means including a valve control circuit for applying the brakes. If the braking rotational speed ratio changes from the prebraking rotational speed ratio, the comparer and voltage control circuit generates a different signal voltage level in response thereto. The valve control circuit for controlling the brake force applied to the brakes is responsive to the different signal voltage level for adjusting the brake force to make the braking rotational speed ratio substantially equal to the prebraking rotational speed ratio. An advantage of this brake control system is to provide more accurate and precise control of the braking and hence of the vehicle. In a more specific embodiment of the apparatus, means are provided for disabling the brakes if the prebraking or braking rotational speed ratio exceeds a predetermined value with a pendulum switch mechanism indicating the beginning of vehicle skid and spin. In addition, means can be provided for actuating a warning system such as operation of the lights and/or horn of the vehicle if the rotational speed ratio exceeds a predetermined value combined with a pendulum switch mechanism. In still another embodiment of the invention, a prebraking rotational speed ratio is determined for one of the front and one of the rear wheels of the vehicle. The voltage control circuit is modified to generate a signal voltage level that is indicative of a braking rotational speed ratio that is different from the actual braking rotational speed ratio of the front and rear wheels generated by an unmodified voltage control circuit. Accordingly, the valve control circuit responds to the different signal voltage level applying the brake harder on the rear wheel than on the front wheel. The advantage of this is to prevent the vehicle from dipping in front and raising in the rear when the brakes are suddenly applied, or from jack-knifing if the vehicle is a tractor-trailer.

The invention and these and other advantages will become more apparent from the detailed description of the preferred embodiments presented below.

BRIEF DESCRIPTION OF THE DRAWING

In the detailed description of the preferred embodiments of the invention presented below, reference is made to the accompanying drawings, in which.

DESCRIPTION OF THE PREFERRED EMBODIMENTS

Because brake control mechanisms for vehicles are well known, the present description will be directed to elements forming part of, or cooperating more directly with, an apparatus or method in accordance with the present invention. Vehicle or brake elements not specifically shown or described should be understood to be selectable from those known in the art.

Figure 1:
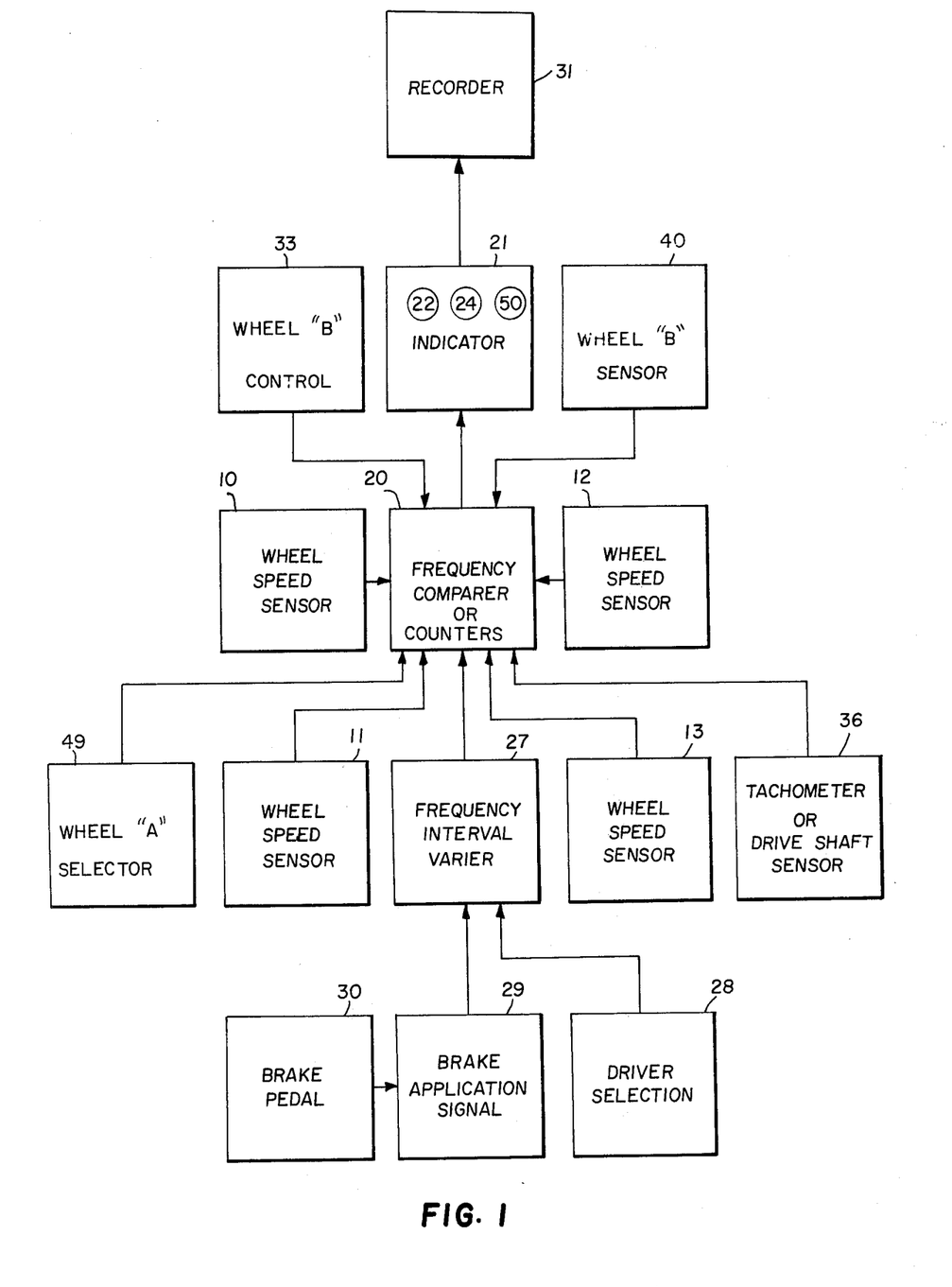
FIG. 1 is a schematic diagram of one embodiment of the invention.

With reference to FIG. 1, a preferred embodiment of an automobile apparatus and method is disclosed for indicating to the driver, during driving, differences in the speed of rotation of the wheels. Elements can be added to or subtracted from the illustrated system depending upon the sophistication desired.

Figure 2:
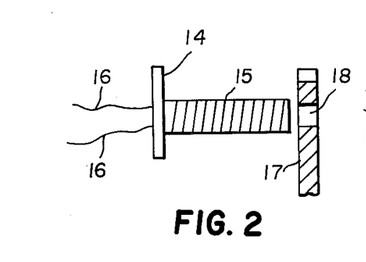
FIG. 2 is a fragmentary front elevational view of a wheel speed sensor for this invention.
Figure 3:
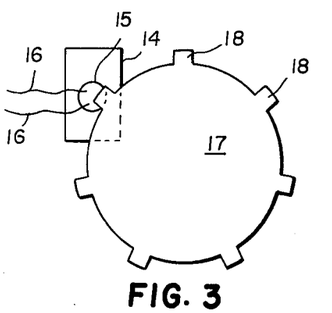
FIG. 3 is a fragmentary, side elevational view of the sensor of FIG. 2.

Wheels speed sensors 10-13 are applied to each wheel "A" of the vehicle such as an automobile, and for a vehicle having more than four wheels, additional wheel speed sensors, not shown, are preferably added. Wheel speed sensors 10-13 each produce an electric pulse train having a frequency directly proportional to the rotational speed of the wheel of the vehicle, and there are several ways that sensors 10-13 can produce such pulse trains. Pneumatic, hydraulic, and optical wheel speed sensors can be used, but the preferred sensors 10-13 use an electromagnetic field in the region of each wheel, and an element rotating with each wheel and disposed to produce an electric pulse as a projection irregularity on the rotating element passes through the electromagnetic field. For example, as schematically shown in FIGS. 2 and 3, a mounting bracket 14 supports an electromagnetic coil 15 energized through wire 16 and disposed adjacent a rotating disc 17 having projection 18 passing near coil 15 as the wheel rotates. Disc 17 can be a disc brake rotating with the wheel, and as many projections 18 can be made as desired. Each time a projection 18 passes by coil 15, a pulse is produced so that the output pulse train is directly proportional to the rotation of the wheel. The frequency of the pulse train depends on the number of projections 18 on disc 17 and the speed of the wheel.

Figure 4:
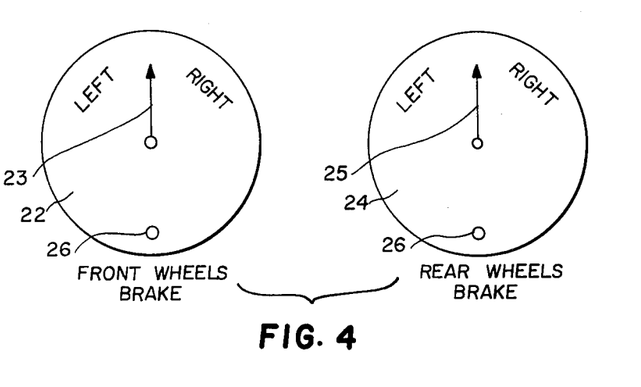
FIG. 4 is a front elevational view of a pair of incators for use in this invention.

Pulse trains from wheel sensors 10-13 are preferably processed in generally known ways and fed to a frequency comparer or counter 20 of any suitable type known in the art which is programmed to make predetermined comparisons in the pulse trains. For example, a wheel speed difference between a pair of front wheels or between a pair of rear wheels is fairly dangerous and it can change the direction of the vehicle when the brakes ae applied. To produce an indication of any such difference, frequency comparer 20 compares the rotational speed of front wheels 12 and 13 and the rotational speed of rear wheels 10 and 11 and provides suitable outputs to indicator 21 for displaying the comparison results to the driver. Such a display could be digital, audible, warning lights, and other warnings or indications, and FIG. 4 shows a possible pair of indicators for such a display. Indicator 22 displays the front wheel rotational speed comparison by moving pointer 23 from the illustrated "0" position toward the fast turning wheel, and indicator 24 provides a similar indication by moving pointer 25 toward the faster one of the rear wheels. If pointers 23 or 25 move off center, the driver knows which wheel of the front pair or rear pair is rotating faster. He can then check for tire wear, underinflation of a tire, or faulty brakes, depending upon the circumstances.

The system illustrated in FIG. 1 has a frequency interval varier 27 that can be controlled through a driver selection input 28 or automatically when the brakes are applied through a brake application signal 29 derived from brake pedal 30. Frequency interval carier 27 provides a variable frequency count time interval when the vehicle is traveling in a prebraking mode of operation, and provides for a relatively instantaneous frequency comparison while the brakes are applied. Accordingly, while the vehicle is traveling, the driver can be informed of differences in wheel rotational speed measured over long or short intervals, or as long as the brakes are applied. Rotational variations are displayed to the driver on indicator 21. Lights 26 on instruments 22, 24, light whenever the brakes are applied to remind the driver that the indicated wheel comparison results are occurring during braking of the vehicle.

The results from frequency comparer 20 and any indication to the driver can also be recorded on recorder 31, if desired. Recorder 31 can be any of several known devices to produce a paper, magnetic, or other record of variations in wheel rotation. Recorder 31 is especially useful for severe braking tests where the driver has little time to observe instruments 22 and 24, and particularly in support of documentation of inspection.

Figure 5:
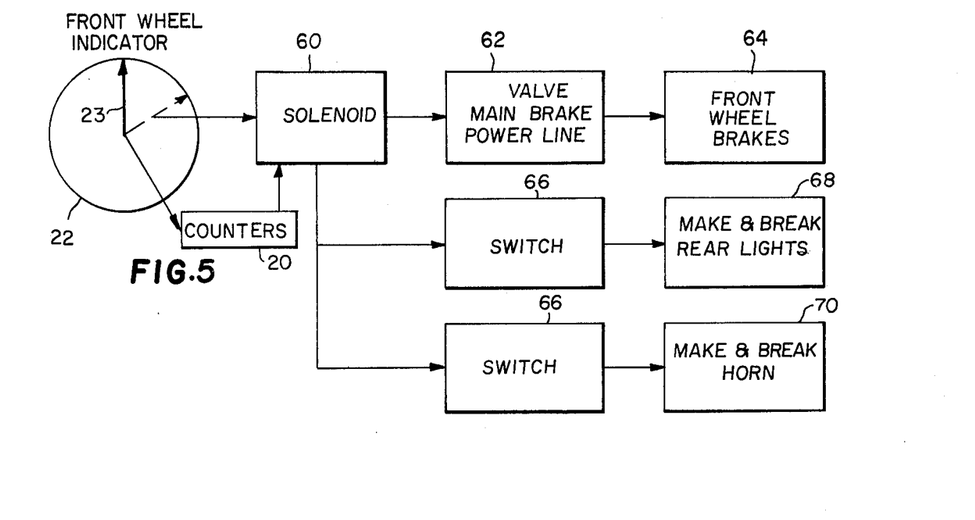
FIG. 5 is a schematic block diagram illustrating a system for disabling the front brakes and intermittently operating the rear lights and horn.

With reference to FIG. 5, a brake control system is disclosed to support the driver to steer the vehicle in the event an extreme fault such as a blowout should occur. In this system, the front wheel indicator 22 is responsive to pulse trains generated by wheel sensors 12, 13 of the front wheels. Should a blowout occur on a front wheel, needle 23 will move rapidly from its normal full line position to a maximum position to the right or left as illustrated by a dotted arrow. The force activating needle 23 and generated by a predetermined pulse difference in counters 20 actuates a solenoid 60 through any suitable mechanism for closing a valve 62 in the main brake power or feeder line preventing the application of fluid pressure to the cylinders of the front wheel brakes 64. Accordingly, the front wheel brakes are disabled, and will remain in this condition until reset. The solenoid 60 also instantaneously activates one or more switches 66 for controlling any suitable electrical make-and-break circuits 68, 70 connected to the rear lights and horn respectively. Consequently, so long as the extreme fault occurs, the front brake systems 64 are disabled, and the rear lights and horn are intermittently operated. Although the brake control system of FIG. 5 is illustrated in relation to a pair of front wheels, such system is clearly applicable to any pair of corresponding wheels.

Figure 6:
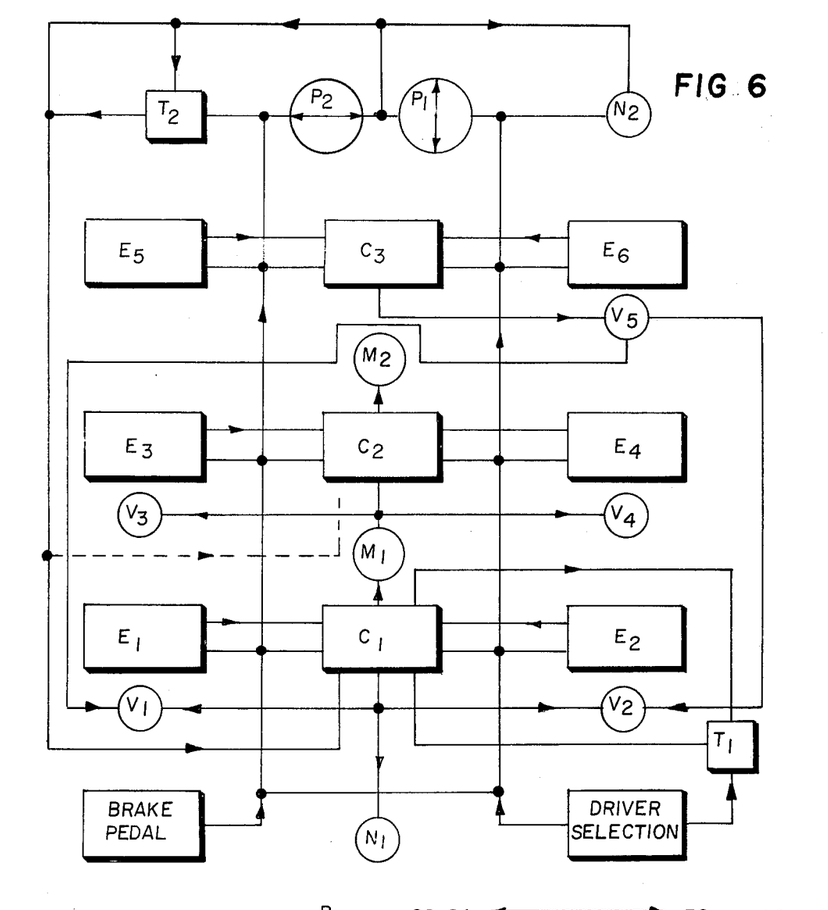
FIG. 6 is a schematic block diagram of another preferred embodiment of this invention.
Figure 8:
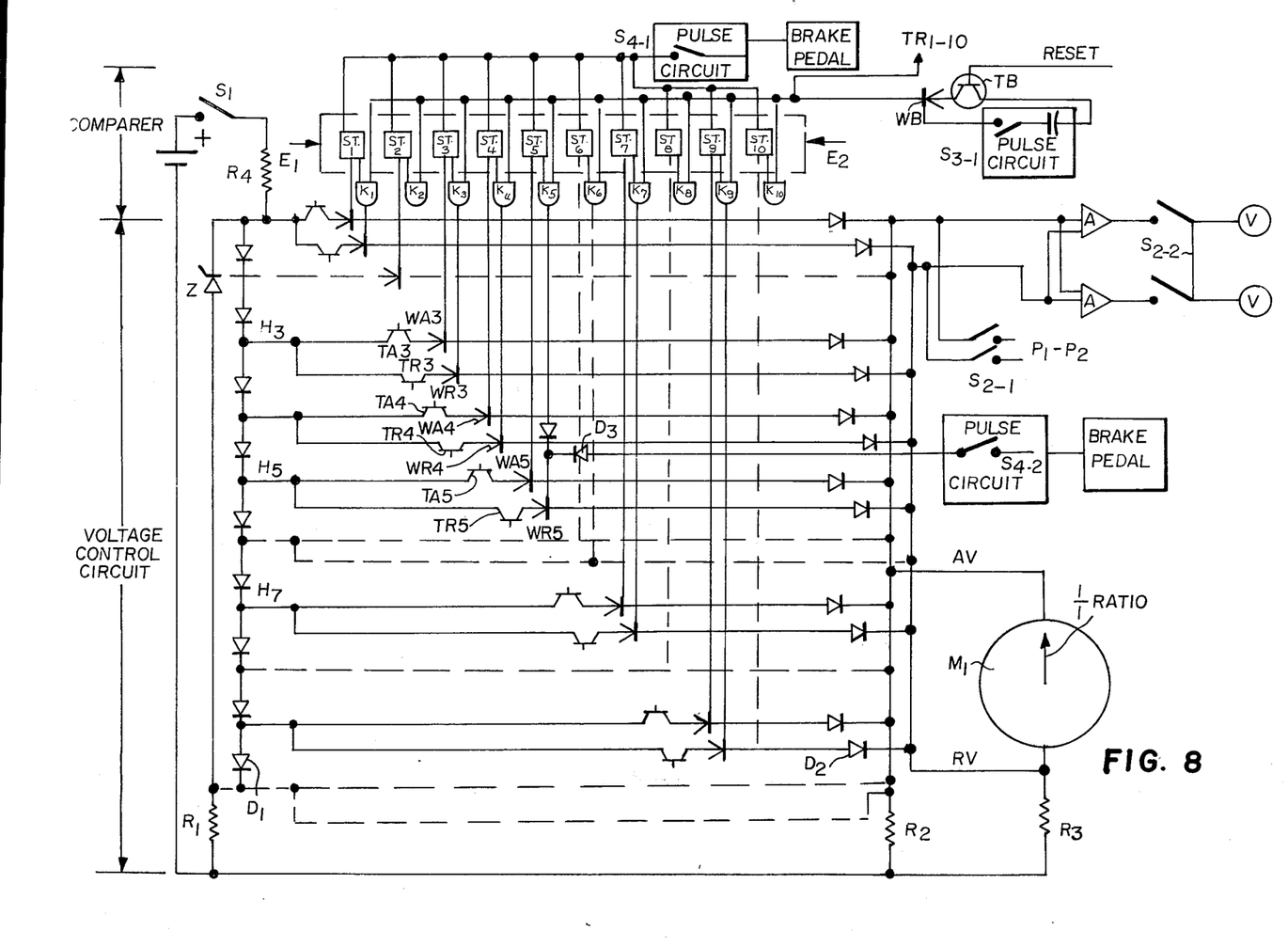
FIG. 8 is an electrical circuit diagram of the brake control system of this invention.

With reference to FIG. 6, a schematic block diagram is disclosed of a vehicle brake control system for determining the prebraking rotational speed ratio of a pair of wheels. The brake control system then controls the brakes during braking to maintain a braking rotational speed ratio substantially equal to the prebraking rotational speed ratio. In this system, a pair of front wheel sensors $E_1$, $E_2$, and a pair of rear wheel sensors $E_3$, $E_4$ are provided. The output of the front wheel sensors is fed into a novel frequency comparer and electronic voltage control circuit $C_1$ as shown in FIG. 8, and the output from the rear wheel sensor is fed into a similar frequency comparer and voltage control circuit $C_2$. The signal outputs of the comparers are supplied to the electronic voltage control circuits and the voltage outputs from the voltage control circuits are fed to dashboard meters $M_1$, $M_2$ and wheel brake valves $V_1$, $V_2$, $V_3$, and $V_4$. The comparers and voltage control circuits $C_1$, $C_2$ determine the prebraking rotational speed ratios of the front and rear wheels respectively and further generate potentials in the voltage control circuit which are fed to the brake valve control circuit during the braking mode of operation of the vehicle. The brake valve control circuit controls the brakes to make the braking rotational speed ratio of the wheels substantially equal to the prebraking rotational speed ratio of the wheels. The advantage of this is to give the driver better control of the vehicle during braking and to greatly minimize the likelihood of one wheel skidding during braking which might tend to cause the vehicle to veer or sway.

Figure 7:
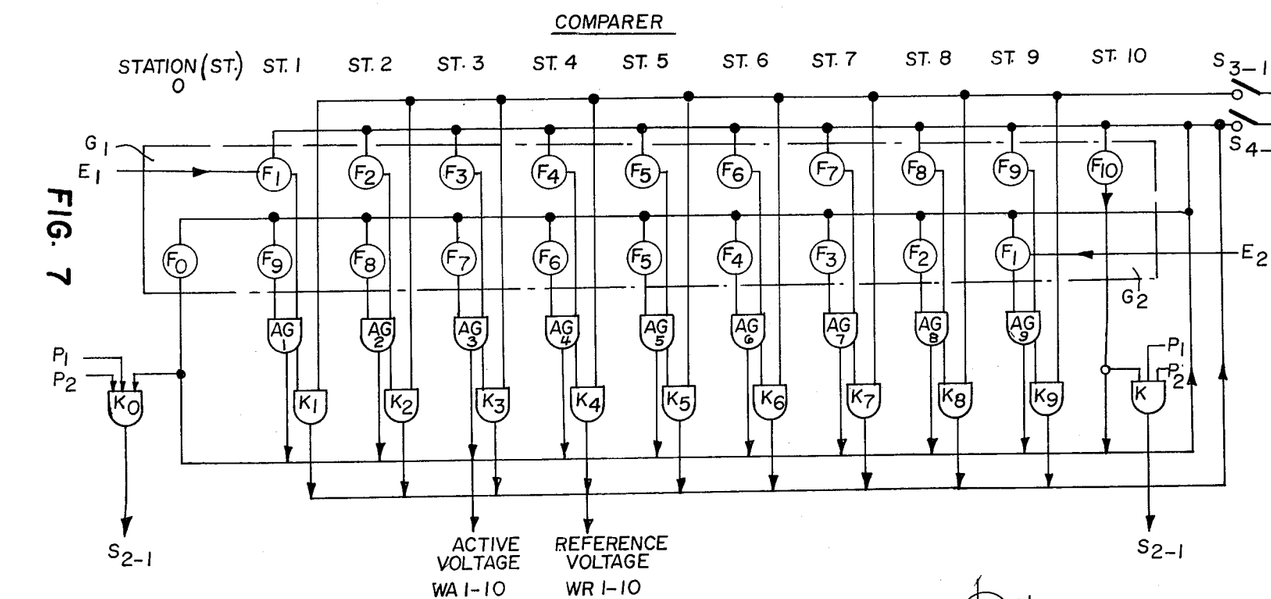
FIG. 7 is an electrical circuit diagram of the comparer for determining the rotational speed ratio of a pair of wheels.

With reference to FIGS. 7 and 8, a preferred embodiment of only the frequency comparer and voltage control circuit $C_1$ is disclosed, since the control circuits $C_1$ and $C_2$ (FIG. 6) are substantially identical. A pair of counters $G_1$, $G_2$ are provided, each having nine counting stations for purposes of illustration, although any suitable number may be used. In addition, two "out-of-control" stations 0 to 10 are provided. The larger the number of stations used the more accurate and precise will be the braking action. The counters $G_1$, $G_2$ are arranged in opposed relation so that the pulses from sensors $E_1$, $E_2$ will enter from opposite ends of the counters. Each station 1-9 has a pair of flip-flops of known type responsive to the pulses entering the counters. Accordingly, as the pulses from sensor $E_1$, proceed through counter $G_1$ from the left to the right, the pulses from sensor $E_2$ proceed through counter $G_2$ from the right to the left. As the pulses proceed through the counters $G_1$, $G_2$ nothing happens as long as only one flip-flop of each station 1-9 is energized. However, when the oppositely directed pulses simultaneously trigger both flip-flops in one station, and an AND gate AG connected thereto, one for each station 1-9, is triggered for supplying a reset pulse to the counters $G_1$, $G_2$ for resetting the counters and transistors TA, one for each station 1-9 and of which only $TA_3$, $TA_4$ and $TA_5$ are shown for purposes of clarity, and for supplying a pulse to a silicon controlled rectifier WA in the voltage control circuit, of which only $WA_3$, $WA_4$ and $WA_5$ are illustrated. Since transistor TA of each station 1-9 normally conducts, the active voltage from the voltage divider network of any known type such as resistors, not shown, connected in series is supplied to one lead of the meter $M_1$ and to one lead of a pair of amplifiers A in the brake valve control circuit. The amplifiers A are connected to the brake valves V through a switch $S_{2-2}$ which is closed during the braking modes of operation, such as by depression of the brake pedal.

When the vehicle brake pedal is in its normal retracted position, a pulse circuit $S_{4-2}$ of any suitable type (FIG. 8) is energized for as long as the brake pedal is retracted for feeding a pulse through a diode D5 to a silicon controlled rectifier WR5. A rectifier WR is provided for each station 1-9 of which only $WR_3$, $WR_4$ and $WR_5$ are shown. WR5 conducts through normally conducting transistor TR5 for supplying a reference voltage of 5 volts from the voltage divider network to another lead of the meter $M_1$ and another lead of the pair of amplifiers A. The meter reading resulting from the active and reference voltages designates the prebraking rotational speed ratio of a pair of wheels. Assuming for the moment that both wheels are rotating at the same speed, the flip-flops at station 5 would both be actuated for feeding an active voltage of 5 volts to the meter. Since the reference voltage supplied through the pulse $S_{4-2}$ is also 5 volts, the meter needle would be in a vertical position including a prebraking rotational speed ratio of 1 to 1.

Let us now assume that one wheel is rotating at a different speed than the other and that as a consequence of this the flip-flops 3 and 7 at station 3 are actuated. Accordingly, the corresponding AND gate AG3 would be energized for energizing the silicon controlled rectifier WA3 for feeding a voltage of 3 volts to the meter $M_1$ as the active voltage. Since the reference voltage through the pulse circuit $S_{4-2}$ is still 5 volts (silicon controlled rectifier WR5 still conducting), the meter needle would move to the left with reference to meter $M_1$ (FIG. 10) indicating a prebraking rotational speed ratio between the wheels of approximately 2.5 which is the ratio of the pulses at station 3. It should be understood that the values indicated are illustrative only and that the actual values would probably vary. Accordingly, as long as the vehicle is operated with the brake pedal in the "up" position, the meter will indicate the prebraking rotational speed ratio of the wheels. Since the prebraking rotational speed ratio is dependent upon such factors such as tire inflation and tire wear, such ratio will remain relatively constant during driving for any pair of wheels over a long period of time.

Let us assume now that the prebraking rotational speed ratio is approximately 2.5 and the driver depresses or applies the brake pedal. This results in the generation of a pulse by pulse circuit $S_{3-1}$ which energizes a silicon controlled rectifier WB for applying a potential to all of the K gates in the counter stages and all transistors (TR1-10) momentarily cutting off the current flow through the transistors. Since AND gate AG3 is the only AND gate operating (due to the aforementioned triggered flip-flops 3 and 7) the K3 AND gate is energized for feeding a reset pulse through transistor TB cutting off the potential to the K gates. The AND gate K3 which continues to operate due to its prior energization also feeds a pulse to silicon controlled rectifier WR3 which conducts through normally conducting transistor TR3 to feed a reference voltage of 3 volts to the meter. Since the active voltage fed through flip-flops 3 and 7 and silicon controlled rectifier WA3 is also 3 volts, the meter needle will return to the vertical position indicating a ratio of 1. The amplifiers and the brake valve circuit are accordingly not subjected to any difference in potential and hence will not affect the operation of the brake valve. Assume however, that as the braking action proceeds, the braking rotational speed ratio of the wheels begins to change and that flip-flops 4 and 6 at station 4 are now actuated resulting in a braking rotational speed ratio of 1.5. Flip-flops 4 and 6 energize AND gate AG4 resulting in an active voltage of 4 volts applied to the brake amplifiers. However, AND gate $K_4$ at station 4 will not operate since the voltage to the K gates has been cut off previously by transistor TB. Silicon controlled rectifier WR3 continues to operate and continues to feed a reference voltage of 3 volts to the amplifiers. Accordingly, the amplifiers are now subjected to a voltage difference of 1 volt which controls the brake valves by reducing the braking force on the harder braking wheel in an effort to return the braking rotational speed ratio of 1.5 back to the prebraking speed ratio of about 2.5 and the needle back to its vertical position.

If a blowout or the like should occur before braking causing a rapid change in the rotational speed ratio of a pair of wheels and a resulting ratio which is off the limits of the comparer, the voltage control circuit would not be able to function. Accordingly, one of the flip-flops at station 0 or 10 would be energized resulting in a pulse fed to AND gate $K_0$ or $K_{10}$ respectively which in coupled with signals applied to the AND gate from pendulums $P_1$ and $P_2$ caused by the vehicle skidding and spinning applies a potential to the amplifiers A which would release the brake valves causing the brakes to be completely disabled on the affected pair of wheels. If no signals are applied by pendulums $P_1$ and $P_2$, the front brakes are not disabled and as soon as the rotational speed ratio returns within the limits of the comparer, brake valve control is automatically implemented in the brake mode, and in the prebraking mode the brakes are again operative.

Figure 9:
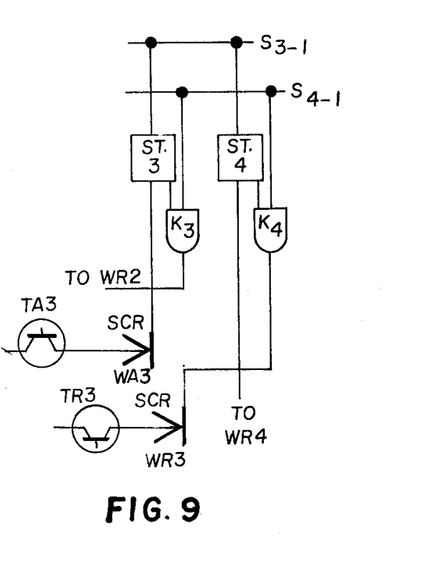
FIG. 9 is a segmental view similar to a portion of FIG. 8 showing a modified voltage control circuit for applying the rear brakes harder than the front brakes.

In order to prevent, for example, the front end of the vehicle from dipping and the rear end raising during the braking operation, and to prevent the trailer from pushing the tractor in brake mode (jack-knifing), it is desirable to apply the rear brakes a little harder than the front brakes so that the braking action on the rear brakes is greater than on the front brakes. This is achieved in this invention by providing a frequency comparer and voltage control circuit $C_3$ (FIG. 6) for comparing the rotational speed ratio of any one of the front wheels with any one of the rear wheels. The control circuit is slightly modified as indicated in FIG. 9 so that the K gate at each station is connected to the voltage control circuit of the previous station. Accordingly, when the brake is applied as described heretofore instead of no voltage difference being applied to the amplifiers A (assuming the braking and prebraking rotational speed ratios are equal), a voltage difference is applied which actuates brake valve $V_5$ (FIG. 6) which in turn controls the wheel brake valves $V_1$ and $V_2$ causing the rear brakes to brake harder than the front brakes. This would also occur for subsequent action during braking in which the rotational speed ratio changes. In the previous example, operation of the flip-flops at station 4 of counters $G_1$ or $G_2$ (FIG. 7) caused a voltage difference of 1 volt to be applied to the amplifiers for controlling the brake valves. However, with comparer and voltage control circuit $C_3$ modified (FIG. 9), a voltage difference of 2 volts would be applied to the amplifiers of the brake valve control circuit causing the rear brakes to brake harder than the front brakes.

Figures 10, 11, 12:
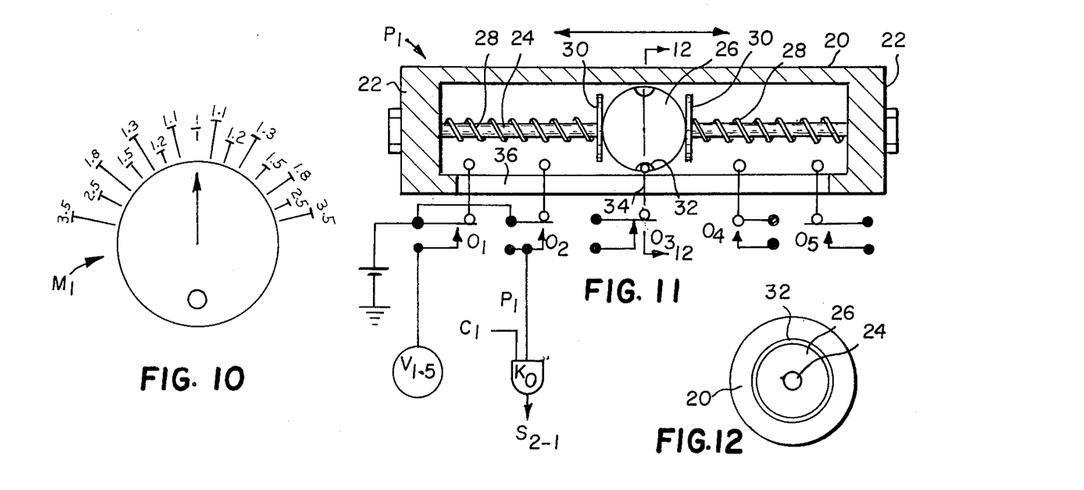
FIG. 10 is an enlarged view of the meter of FIG. 8.
FIG. 11 is a section view of a pendulum switch for use in this invention.
FIG. 12 is a section view taken substantially along line 12—12 of FIG. 11.

With reference to FIGS. 6, 11 and 12, a mechanical system is disclosed for use in conjunction with the frequency comparer FIG. 4 and control circuit FIG. 8 for disabling the front brakes of a two axle vehicle such as a car or all of the tractor wheels of a tractor-trailer vehicle in those instances in which the vehicle goes into a skid and spin. In this situation, switches $O_{1-5}$ actuated by the pendulums $P_1$, $P_2$ feed a voltage to the gates $K_0$, $K_{10}$ in combination with the counters $G_1$, $G_2$ (FIG. 7) and to the control circuit (FIG. 8) for disabling the brakes for a time interval determined by timers, T2 (FIG. 6). In addition, a warning device of any suitable type such as the horn or intermittent operation of the rear brake lights may also be activated.

The pendulums $P_1$, $P_2$ each comprise a cylindrical member 20 having closed ends 22 for rigidly supporting an axial shaft 24. A ball 26 is slideably mounted on shaft 24 within cylinder 20 and is held in a normal central position by a pair of springs 28 of equal strength interposed between the cylinder ends 22 and discs 30 bearing against the ball. The ball has a notch 32 within which one end of a depressable switch actuator 34 is recessed. The switch actuator 34 is slideably mounted within an elongated axially extending slot 36 in the cylinder, and the opposite end of the actuator cooperates with a plurality of switches $O_{1-5}$. Although only five switches are illustrated schematically, any number of such switches can be used. The pendulums $P_1$, $P_2$ are preferably mounted in the rear of a vehicle with one arranged parallel to the vehicle axis and the other arranged at right angles thereto as illustrated schematically in FIG. 6. Accordingly, during normal operation of the vehicle, the balls of pendulums $P_1$, $P_2$ will assume the central positions actuating switches $O_3$ for indicating via a dash light that the pendulums are operative, i.e., no broken springs or the like. Also in this position the brake valves will be unaffected. However, should the vehicle spin, the centrifugal and inertial forces will cause the balls 26 to slide along the shafts actuating the switches. If switches $O_2$ or $O_4$ are actuated by pendulums $P_1$ and $P_2$ a signal will be fed to AND gate $K_0$ or $K_{10}$. If a signal is also supplied by a comparer and voltage control circuit $C_1$ or $C_2$, the front brakes will be disabled. If the spin is more severe causing switches $O_1$ or $O_5$ to be actuated, brake valves $V_{1-5}$ are actuated directly to disable the front brakes.

In the situation where the vehicle is travelling at high speed and the brakes applied hard, it is desirable to ease the extreme stress to which the brake material is subjected. This is accomplished by the operation of pendulum $P_1$ (FIG. 6) only since pendulum $P_2$ is inactive unless the vehicle is spinning. During such hard braking, the ball is pendulum $P_1$ will oscillate back and forth automatically causing switches similar to switches $O_{1-5}$ to intermittently disable the brakes resulting in an automatic brake pumping action. For better control of the braking intervals, a timer $T_1$ (FIG. 6) can be electrically coupled to the switches rather than relying solely on the mechanical properties of the pendulum $P_1$.

The invention has been described in detail with particular reference to preferred embodiments, but it will be understood that variations and modifications can be effected within the spirit and scope of the invention as described.

What is claimed is:

1. A method for determining the prebraking rotational speed ratio in a prebraking mode of operation of first and second wheels of a vehicle equipped with first and second wheel brakes respectively comprising the steps of:
    detecting the speeds of rotation of said first and second wheels in the prebraking mode of operation by generating first and second prebraking pulse trains of energy respectively of varied frequency; and
    feeding said first and second prebraking pulse trains of energy to an electrical control circuit which in the prebraking mode of operation generates a fixed prebraking reference voltage signal and includes a pair of pulse train frequency counters connected in opposed relation and having a plurality of electrical stations for generating (1) a prebraking active voltage signal of one value when one of said station is energized by both of said first and second prebraking pulse trains and (2) an active prebraking voltage signal of a different value when a different one of said stations is energized by both of said first and second prebraking pulse trains wherein the ratio of said active and reference prebraking voltage signals is indicative of the prebraking rotational speed ratio of the first and second wheels.

2. The method according to claim 1 comprising the further step of supplying said prebraking active and reference voltage signals to a meter in the prebraking mode of operation for visually indicating the prebraking rotational speed ratio of the first and second wheels.

3. The method of claim 1 wherein one of said first and second wheels is a front wheel and comprising the further steps of vehicle deceleration in the forward direction and acceleration in a lateral direction indicating vehicle spin, and disabling the front wheel brake of the vehicle if vehicle deceleration and acceleration are sensed so that the front wheel brake cannot be applied.

4. The method according to claim 1 comprising the further steps of sensing vehicle deceleration in the forward direction due to hard braking, and intermittently operating said first and second wheel brakes in response to said sensing means.

5. The method according to claim 1 comprising the further steps of applying the brakes of the vehicle in a braking mode of operation, detecting the speeds of rotation of said first and second wheels in the braking mode of operation by generating first and second braking pulse trains of energy respectively of varied frequency, and feeding said first and second braking pulse trains to said electrical control circuit which in the braking mode of operation generates a varied braking reference voltage signal and a varied braking active voltage signal wherein the ratio of said braking reference voltage signal and braking active voltage signal is indicative of the braking rotational speed ratio of said first and second wheels, and supplying said braking reference and braking active voltage signals to a brake valve control circuit for adjusting the brakes to maintain the braking rotational speed ratio of said first and second wheels substantially equal to the prebraking rotational speed ratio.

6. The method according to claim 5 comprising the further step of supplying said braking active and braking reference voltage signals to a meter in the braking mode of operation for indicating the braking rotational speed ratio of the first and second wheels.

7. The method according to claim 5 comprising the further steps of sensing vehicle deceleration in the forward direction and acceleration in a lateral direction indicating vehicle spin, and disabling the brakes of said first and second wheels if the braking rotational speed ratio exceeds a predetermined value and said vehicle deceleration and acceleration are sensed.

8. The method according to claim 7 comprising the further step of actuating a warning system comprising at least one of the lights and horn of the vehicle if the brakes of said first and second wheels are disabled.

9. The method according to claim 1 wherein the first and second wheels are front and rear wheels respectively, and a prebraking rotational speed ratio is determined in the prebraking mode of operation of the vehicle by the steps of detecting the speeds of rotation of said first and second wheels in the prebraking mode of operation by generating first and second prebraking pulse trains of energy respectively of varied frequency, and feeding said first and second prebraking pulse trains of energy to an electrical control circuit which in the prebraking mode of operation generates a fixed prebraking reference voltage signal and includes a pair of pulse train frequency counters connected in opposed relation and having a plurality of electrical stations for generating (1) a prebraking active voltage signal of one value when one of said stations is energized by both of said first and second prebraking pulse trains, and (2) an active prebraking voltage signal of a different value when a different one of said stations is energized by both of said first and second prebraking pulse trains, comprising the further steps of applying the brakes of the vehicle in a braking mode of operation, detecting the speeds of rotation of said first and second wheels in the braking mode of operation by generating first and second braking pulse trains of energy respectively of varied frequency, and feeding said first and second braking pulse trains to said electrical control circuit which in the braking mode of operation generates a varied braking reference voltage signal and a varied braking active voltage signal wherein the ratio of said braking reference voltage signal and braking active voltage signal is indicative of the braking rotational speed ratio of said first and second wheels, wherein even when said prebraking and braking rotational speed ratios are equal said braking active and braking reference voltage signals generated in said voltage control circuit have a voltage differential in the braking mode of operation which is of a different level than the voltage differential between said prebraking active and prebraking reference voltage signals generated in the prebraking mode of operation whereby said brake means applies the brakes harder on said rear wheels than on said front wheels.

10. A vehicle brake control system for first and second wheels of a vehicle equipped with brakes comprising:
    means for detecting the prebraking and braking speeds of rotation of said first and second wheels;
    means responsive to said detecting means for generating first and second pulse trains of energy respectively of varied frequency in said prebraking and braking modes of operation;
    comparer means comprising first and second pulse train frequency counters connected in opposed relation for receiving said first and second pulse trains respectively, said first and second pulse train counters having a plurality of counting stations, each station having (1) first and second flip-flops for receiving said first and second pulse trains respectively, (2) a first AND gate for receiving input signals from said first and second pulse trains and having an active output pulse signal when said first and second flip-flops simultaneously receive said first and second pulse trains, and (3) a second AND gate for receiving inputs from said first AND gate and a reset circuit, and having a reference output pulse signal;

voltage control circuit means for receiving said active and reference pulse signals during prebraking and braking modes of operation and generating active and reference voltage signals respectively of a predetermined rotational speed ratio in the prebraking and braking modes of operation; and brake means including valves for receiving said active and reference voltage signals in the braking mode of operation for continuously adjusting the brakes on said first and second wheels to maintain the braking rotational speed ratio of said first and second wheels substantially equal to the prebraking rotational speed ratio.

11. The vehicle brake control system of claim 10 and further comprising a meter for receiving said active and reference voltage signals for visually indicating the speed ratio of the first and second wheesl in the prebraking and braking modes of operation.

12. The vehicle brake control system of claim 10 wherein said first and second wheels are front and rear wheels respectively, and wherein when said prebraking and braking rotational speed ratios are substantially equal, said active and reference voltage signals generated in said voltage control circuit have a voltage differential in the braking mode of operation which is of different level than the voltage differential in the prebraking mode of operation whereby said brake means applies the brakes harder on said rear wheels than on said front wheels.

13. A vehicle brake control system for first and second wheels of a vehicle equipped with brakes comprising:

means for detecting the prebraking and braking speeds of rotation of said first and second wheels;

means responsive to said detecting means for generating first and second pulse trains of energy respectively of varied frequency in said prebraking and braking modes of operation;

comparer means for receiving said first and second pulse trains respectively and generating active and reference output pulse signals during prebraking and braking modes of operation;

voltage control circuit means for receiving said active and reference output pulse signals during prebraking and braking modes of operation and generating active and reference voltage signals respectively of a predetermined rotational speed ratio in the prebraking and braking modes of operation; and brake means including valves for receiving said active and reference voltage signals in the braking mode of operation and in response thereto for continuously adjusting the brakes on said first and second wheels in an effort to maintain the braking rotational speed ratio of said first and second wheels substantially equal to the prebraking rotational speed ratio.

* * * * *